United States Patent [19]
Pannone

[11] Patent Number: 5,462,403
[45] Date of Patent: Oct. 31, 1995

[54] COMPRESSOR STATOR VANE ASSEMBLY

[75] Inventor: John L. Pannone, Glastonbury, Conn.

[73] Assignee: United Technologies Corporation, Hartford, Conn.

[21] Appl. No.: 215,335

[22] Filed: Mar. 21, 1994

[51] Int. Cl.[6] .............................. F01D 9/04; F01D 11/08
[52] U.S. Cl. .................................. 415/173.1; 415/173.4; 415/190; 415/209.2
[58] Field of Search .................... 415/173.1, 173.4, 415/189, 190, 199.5, 209.1, 209.2, 209.3

[56] References Cited

U.S. PATENT DOCUMENTS

| | | |
|---|---|---|
| 2,625,013 | 1/1953 | Howard et al. ........................ 415/209.2 |
| 2,915,281 | 12/1959 | Ridley et al. ......................... 415/209.1 |
| 4,101,242 | 7/1978 | Coplin et al. ......................... 415/199.5 |
| 4,529,355 | 7/1985 | Wilkinson ............................ 415/173.1 |
| 4,543,039 | 9/1985 | Ruis et al. . |
| 4,875,828 | 10/1989 | Willkop et al. ....................... 415/173.4 |
| 5,314,303 | 5/1994 | Charbonnel et al. ................. 415/173.1 |

*Primary Examiner*—Edward K. Look
*Assistant Examiner*—James A. Larson
*Attorney, Agent, or Firm*—Edward L. Kochey, Jr.

[57] ABSTRACT

The arcuate vane support segments (26) each carry a plurality of vanes (28) and have a pair of axially extending feet (38). These feet do not slide axially into a groove, but move radially against an arm (22) of the "T" shaped air seal. The casing ring 62 is translated axially in place entrapping the feet (38).

3 Claims, 1 Drawing Sheet

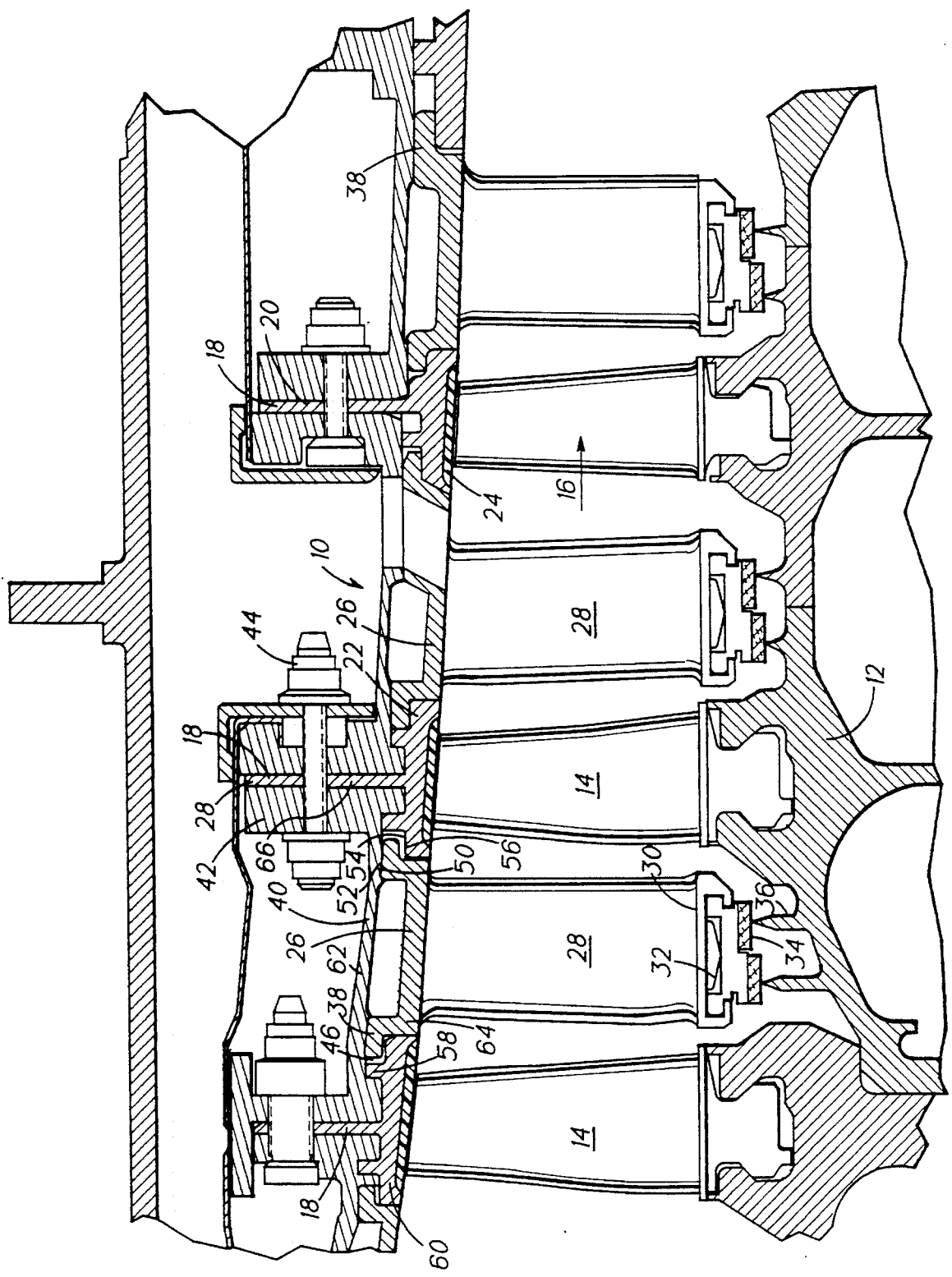

COMPRESSOR STATOR VANE ASSEMBLY

TECHNICAL FIELD

The invention relates to gas turbine engines for aircraft and in particular to a high pressure compressor construction.

BACKGROUND OF THE INVENTION

An aircraft gas turbine engine requires a compressor and a turbine. The compressor frequently is in two sections, there being a low pressure compressor and a high pressure compressor. Low weight is important and it is desirable to maintain a good margin from engine surge or stall. Close spacing of the vanes and blades is desirable to minimize the length and weight of the compressor, although enough spacing must be left to tolerate deflection under loads and thermal expansion differences without rubbing.

Uniform clearance between the rotating blades and the casing is desirable since this provides a better surge margin. A structure should be supplied which permits design tuning for thermal inertia of the adjacent parts during transients.

It is also desirable that the vanes be mechanically damped to avoid high stresses with synchronous vibration.

Certain surfaces are wear prone. It is desirable to provide these surfaces in a manner that they may receive surface treatment not only originally, but also during rework for maintenance.

Should there be a need to change the aerodynamics of the compressor, it is desirable that this be possible without changing the case.

Simple fabrication is always desirable since this leads to low cost hardware. The vanes are preferably installed in a manner with tight clearances to minimize vane sloping. The vanes can rotate around their support point if there is excessive clearance, thereby decreasing the actual spacing between the vanes and the blades.

In one prior art system there is a "T" shaped air seal which is a full ring surrounding the location of a compressor blade. This "T" seal carries an abradable surface on the inside edge. Adjacent to "T" shaped air seal, vanes are individually supported on a support member. This support member has a tongue which fits within a groove in the air seal. Assembly of the turbine requires that the vane be radially installed and that thereafter moved axially so that the tongue may then engage within the groove. The groove is not readily accessible for surface treatment. Multiple tolerances are involved in forming this tongue and groove circumferential structure.

SUMMARY OF THE INVENTION

The compressor stator vane assembly has a plurality of full ring outer air seals. Each is of a "T" shaped cross-section with the base of the "T" extending radially outwardly. An abradable seal is carried on the head or arms of the "T".

A full ring casing ring is flanged to the base of adjacent air seals. It is spaced outwardly from the ends of the arms of the air seals. A slot is thereby formed between the end portions of each arm and the case.

An arcuate vane support member has axially extending feet, each foot projecting and engaging one of the slots formed between the arm and the case. During installation this is not a slot but an open shoulder so that the vane support segment may be moved in radially without any required axial movement. The full ring case is then slid axially over the vane support segment. A plurality of stator vanes is secured to the vane support segment and they extend radially inward, preferably having an inner shroud and a damping arrangement.

BRIEF DESCRIPTION OF THE DRAWINGS

The Figure is a sectional view showing a plurality of vanes and blades and the construction of the stator vane assembly.

DESCRIPTION OF THE PREFERRED EMBODIMENT

The high pressure compressor 10 has a rotor 12 carrying a plurality of compressor blades 14. An axial flow of air 16 is compressed as it moves axially from an upstream location to a downstream location.

Each outer air seal 18 is a full ring of a "T" cross-section. The base 20 of the "T" extends radially outwardly. The arms or head 22 of each "T" extends substantially parallel to the airflow 16. An abradable seal 24 is secured within the air seal.

A plurality of arcuate vane support segments 26 each carry a plurality of stator vanes 28. These vanes extend inwardly from the vane support segment and terminate in an inner shroud 30 with a damper 32. They also carry abradable air seals 34 which interface with knife edges 36 on the rotor to provide sealing of airflow.

Each arcuate vane support 26 has a pair of axially extending feet 38 which fit against the outside surface of the air seal 18 and are entrapped by a full ring case section 40.

The full ring case section 40 is flanged with flanges 42 to the base 20 of an air seal, being bolted thereto with bolts 44. A slot 46 is formed between the ring case section and the outer air seal into which the projections 38 fit.

The full ring outer air seal with the full ring case sections permit good control of roundness and therefore a uniform circumferential blade clearance between the blades 14 and the abradable air seal 24. This results in an increased surge margin attributed to the uniform circumferential clearances.

The base 20 of the air seals 18 and the full ring case flanges 42 may be associated with appropriate masses of metal and material choice to tune the thermal response of the air seal to the expected temperature transients.

Mechanically damped fixed stator vanes are achieved resulting in limited vibration of the vanes.

The surface 50 on the case ring abuts against the surface 52 on the axially extending vane feet 38. Also surface 54 on the seal ring abuts surface 56 on axially extending vane feet 38. These are the surfaces which can rub against one another and are subject to wear during operation of the compressor. All of these surfaces are readily accessible for flame spraying or other treatment of the surface. This permits not only appropriate surface treatment during manufacture but also easy rework of the surface for maintenance.

Should the aerodynamics of the engine require an adjustment, new vanes 28 may be installed without changing the casing rings 40. The case and seals are producible from turned rings thereby being to low cost hardware.

The close tolerance between the two surfaces of the projections 52,56 of the axially extending feet 38 of the vane support segments can be easily achieved. Also the inside diameter of the casing segment of this area (surface 50) and the outside diameter of the air seal (surface 54) can be easily produced to a close tolerance. These close tolerances cited above result in a controlled fit between the two members being achieved thereby producing less sloping or rotation of vanes 28 around the support during various loads.

Each air seal 18 has on each arm 22 a spacer 58 integral with the air seal which extends radially outward in contact with the case. This has an advantage in that it provides radial stiffness to the air seal 18. It also permits close control of the manufacturing tolerance across the slot 46 by allowing the radial dimension to be maintained.

Assembly of the compressor proceeds from left to right on the Figure and for the purpose of this discussion it is assumed that air seal 60 is in place. It should be noted that during assembly of the casing with vanes 28, the rotor 12 and blades 14 are already in place. Casing ring 62 is not yet in place so that the vane with support segments 64 may be passed radially inward with the projections 38 resting on the outer surface of the installed air seal. No axial movement of the vane is required during installation and therefore no clearance need be left between vanes 28 and blades 14 for this movement.

Casing ring 62 is then translated axially from the right hand side against the flange and bolted in place. The full ring outer air seal 66 may then be slid axially from a downstream location into place. The above described operation is repeated for the remaining vane support segments, casing portions and air seal rings.

The construction facilitates uniform blade tip clearances and concomitant improved surge margin. The structures may be thermally tuned and the vanes clamped. Easy access for surface treatment of wearing surfaces improves initial fabrication and simplifies maintenance. Aerodynamics changes can easily be made. Minimum spacing between vanes and blades is achieved since the vanes do not require axial movement for installation. Further, close tolerances can be maintained at the support segment feet location, decreasing vane rotation.

I claim:

1. A compressor stator vane assembly comprising:

a plurality of full ring outer air seals 18 each of a "T" cross-section having a base and two arms, said arms each having an end portion remote from said base, with the base 20 of the "T" extending radially outwardly;

a full ring case 40 flanged to the base 20 of adjacent air seals and outwardly spaced from the end portion of the arms 22 of said air seals, whereby a slot 46 is formed between the end portion of each arm and said case;

an arcuate vane support segment 26 having axially extending feet 38, said axially extending feet being the sole axially extending feet on said arcuate vane support segment and located on the outer circumference of said arcuate vane support segment, each one projecting into one of said slots 46; and a plurality of stator vanes 28 secured to and extending radially inward from said vane support segment 26.

2. A compressor stator vane assembly as in claim 1 further comprising:

a spacer 58 integral with said air seal, located on each of said arms of said "T" section and extending radially outward in contact with said case.

3. A compressor stator vane assembly as in claim 2 comprising also:

an inner shroud 30 secured to said plurality of vanes which are secured to each vane support segment.

* * * * *